(12) United States Patent
Ahmed et al.

(10) Patent No.: US 8,379,520 B2
(45) Date of Patent: Feb. 19, 2013

(54) GROUP BASED PACKET SCHEDULING ALGORITHM

(75) Inventors: Nasir Ahmed, Houston, TX (US); Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/792,569

(22) Filed: Mar. 3, 2004

(65) Prior Publication Data

US 2005/0195843 A1 Sep. 8, 2005

(51) Int. Cl.
*G08C 15/00* (2006.01)

(52) U.S. Cl. .................. 370/234; 370/230; 370/232

(58) Field of Classification Search ............... 370/310, 370/328–332, 336–337, 343–348, 431, 436, 370/442–444, 478, 480, 498, 230, 232, 234
See application file for complete search history.

(56) References Cited

U.S. PATENT DOCUMENTS

| 2002/0021678 | A1* | 2/2002 | Heatwole et al. | 370/325 |
| 2002/0197999 | A1* | 12/2002 | Wu et al. | 455/452 |
| 2003/0104817 | A1* | 6/2003 | Damnjanovic | 455/452 |
| 2007/0153690 | A1* | 7/2007 | Stanwood et al. | 370/230 |

* cited by examiner

*Primary Examiner* — Jason Mattis
(74) *Attorney, Agent, or Firm* — Lawence J. Bassuk; W. James Brady; Frederick J. Telecky, Jr.

(57) ABSTRACT

A system comprises a base station, a plurality of mobile stations, and a packet scheduling algorithm that operates on the base station. The packet scheduling algorithm groups the plurality of mobile stations into a plurality of groups based on average throughput with the base station. The packet scheduling algorithm selects one of the plurality of groups for applying a scheduling metric.

12 Claims, 2 Drawing Sheets

GROUP BASED PACKET SCHEDULING ALGORITHM

BACKGROUND OF THE INVENTION

1. Technical Field

The present subject matter relates in general to packet scheduling algorithms and more particularly, to high-performance wireless packet scheduling algorithms.

2. Background Information

In many wireless communication systems (e.g., cellular networks), information, such as data, audio, or video, is exchanged between a base station and one or more mobile stations. Each mobile station may establish a communication channel with the base station for sending and receiving packets of information. Various wireless phenomena, such as fading, shadowing, and interference, may alter the condition of a communication channel and affect the maximum rate of information capable of being transmitted through the communication channel without a transmission error. Collectively, the information transported via the communication channels may represent the total bandwidth of the wireless communication system.

Packet scheduling algorithms may attempt to maximize the utilization of bandwidth by distributing available resources, such as time slots and spreading codes, to communications channels that possess desired channel characteristics, such as a high carrier-to-interference (C/I) ratio or signal-to-noise ratio (SNR). Unfortunately, such packet scheduling algorithms may lead to starvation of the undesired channels, reducing the quality of service (QoS) received by users of these channels. In addition, such algorithms may be computationally intensive, reducing the performance of the packet scheduling process.

BRIEF SUMMARY

In accordance with at least some embodiments of the invention, a system comprises a base station, a plurality of mobile stations, and a packet scheduling algorithm that operates on the base station. The packet scheduling algorithm groups the plurality of mobile stations into a plurality of groups based on average throughput with the base station. The packet scheduling algorithm selects one of the plurality of groups for applying a scheduling metric.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary, of that embodiment, and not intended to intimate that the scope of the disclosure, including the claims, is limited to that embodiment.

Figure 1:
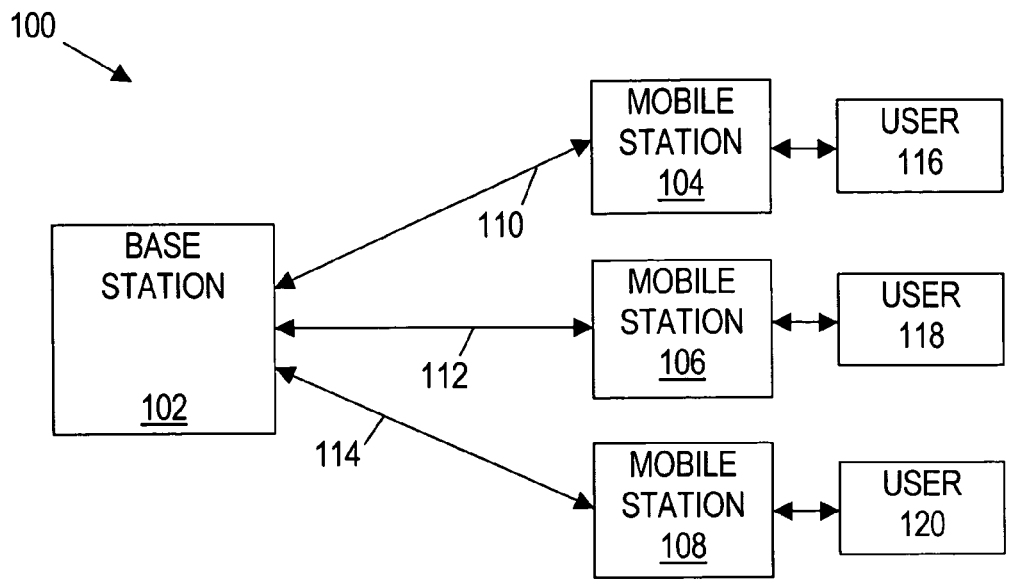
FIG. 1 shows a communication system in accordance with an exemplary embodiment of the invention and including a base station.

FIG. 1 shows an exemplary embodiment of a communication system 100. As shown, the communication system 100 comprises a base station 102 coupled to one or more mobile stations 104-108 via communications channels 110-114. One or more users 116-120 may operate each mobile station 104-108. The communication channels 110-114 facilitate the wireless exchange of information between the base station 102 and the mobile stations 104-108. Each communication channel 104-108 may represent a pair of electromagnetic frequencies (frequency division duplex (FDD) mode) or a single frequency that is shared in time (time division duplex (TDD) mode) that are used to send and receive packets of information to and from the base station 102. The communication system 100 may be representative of any type of wireless communication system, such as analog or digital cellular networks.

Figure 2:
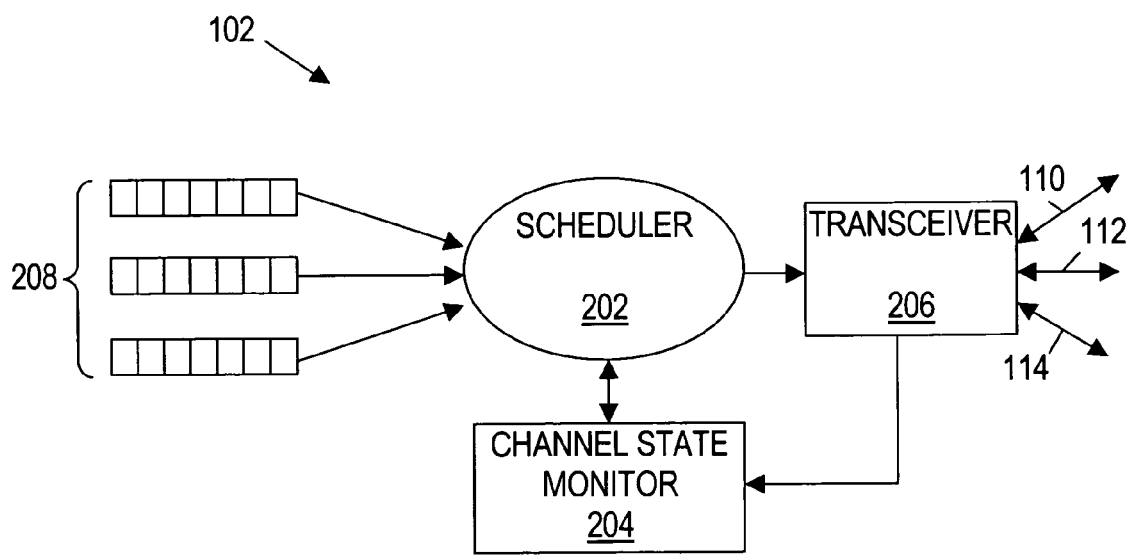
FIG. 2 depicts the base station of FIG. 1 in greater detail.

FIG. 2 illustrates the base station of FIG. 1 in greater detail. As shown, the base station 102 comprises a packet scheduler 202, a channel state monitor 204, and a transceiver 206. The packet scheduler 202 may schedule packets of information 208 that are to be sent by the transceiver 206 to the mobile stations 104-108 (FIG. 1) via the communications channels 110-114. Although the packet scheduler 202 preferably comprises a processor-executable packet-scheduling algorithm, specialized hardware in combination with software may also be used. In alternative embodiments of the invention, the packet scheduler 202 operates as part of the network that controls the base station. For example, in a 2G global system for mobile communications (GSM) network, the packet scheduler 202 may operate in a base transceiver station (BTS), and in a 3G wideband code division multiple access (WCDMA) network, the packet scheduler 202 may operate in a Node B transceiver connected to a radio network controller (RNC).

The channel state monitor 204 may monitor the states of the communication channels 110-114 and obtain characteristics associated with the channels, such as carrier-to-interference (C/I) ratio, signal-to-noise ratio (SNR), signal-to-interference ratio (SIR), and instantaneous data rate. The packet scheduler 202 may use these characteristics as inputs to the packet-scheduling algorithm.

Packet schedulers typically allocate resources, such as timeslots and additional bandwidth, to a user k according to the rule:

$$k(t) = \arg\max_k [F_k(t)] \quad (1)$$

where $F_k(t)$ is the priority function of the scheduler. Thus, the scheduler may allocate additional resources to the user that maximizes the priority function at a given time.

Each type of packet scheduler may be associated with a unique priority function. For example, a maximum carrier-to-interference (C/I) packet scheduler may utilize the priority function:

$$F_k(t) = R_k(t) \quad (2)$$

where $R_k(t)$ is the instantaneous data rate that user k can achieve at time t. The instantaneous data rate preferably is obtained for each user from a channel state monitor at each transmit time interval (TTI). For a proportional fair (PF) scheduler, $$F_k(t) = c_k \frac{R_k(t)}{[T_k(t)]^\lambda} \quad (3)$$

where $\lambda$ is a fairness factor, $c_k$ is a priority factor, $R_k(t)$ is the instantaneous data rate that user k can achieve at time t, and $T_k(t)$ is the average throughput that user k has achieved over a defined time period.

The max carrier-to-interference scheduler and the proportional fair scheduler both utilize communication channel characteristics provided by a channel state monitor to increase utilization of the wireless bandwidth at the expense of fairness between users. For example, the max carrier-to-interference scheduler may consistently schedule packets for users that possess high instantaneous data rates. Thus, packets associated with users of low data rate communication channels may be scheduled, leading to "starvation" of the user.

An additional type of packet scheduler, referred to as the round-robin (RR) scheduler, maintains fairness between users when scheduling packets, regardless of communication channel conditions. The priority function of the round-robin scheduler may be a random or pseudo-random function designed to schedule packets fairly among users, regardless of the throughput achieved or bandwidth utilized. For example, a round-robin scheduler may take turns scheduling packets by assigning timeslots sequentially to each user.

Embodiments of the invention permit the packet scheduler 202 to increase utilization of bandwidth while maintaining fairness between the users 116-120. In addition, the packet scheduling techniques disclosed preferably reduce the number of computations performed by the packet scheduler 202, thereby increasing the performance of the packet scheduling algorithm.

Figure 3:
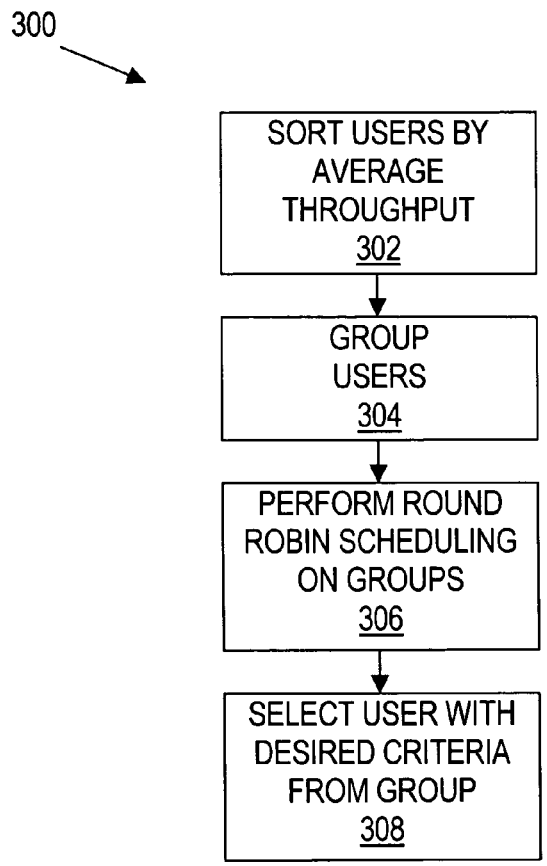
FIG. 3 illustrates a preferred packet scheduling procedure.

FIG. 3 illustrates a preferred scheduling procedure 300 performed by the packet scheduler 202. The scheduling procedure 300 may start by sorting the users 116-120 by the average throughput of their communications channels 110-114 (block 302). The sorted users may then be divided into groups (block 304). Although the groups preferably are of equal size, each group may comprise of any number of users. Round-robin scheduling may be performed on the groups to select one of the groups (block 306). Within the selected group, a user that satisfies a priority function, such as the max carrier-to-interference or proportional fair priority functions, is selected. Packets associated with the selected user may be scheduled by the scheduler 202 and queued for transmission by the transceiver 206 (block 308).

Although many different types of averaging functions, such as mean, median, and mode, may be utilized to compute an average throughput (block 302), the average throughput T that user k preferably achieves at time t is defined as the weighted mean:

$$T_k(t) = (1-\alpha)T_k(t-1) + \alpha R_k(t) \quad (4)$$

where $\alpha$ is a weighting factor between 0 and 1, and $R_k(t)$ is the instantaneous data rate that user k can achieve at time t.

Alternative embodiments of the invention may impose at least a minimum level of quality of service (QoS) during the packet scheduling procedure. If during the round-robin selection (block 306), no user in the selected group meets a minimum QoS criteria, such as a minimum instantaneous data rate, a new group may be selected via round-robin selection. Thus, the alternative embodiments impose a minimum level of quality of service among users.

Figure 4:
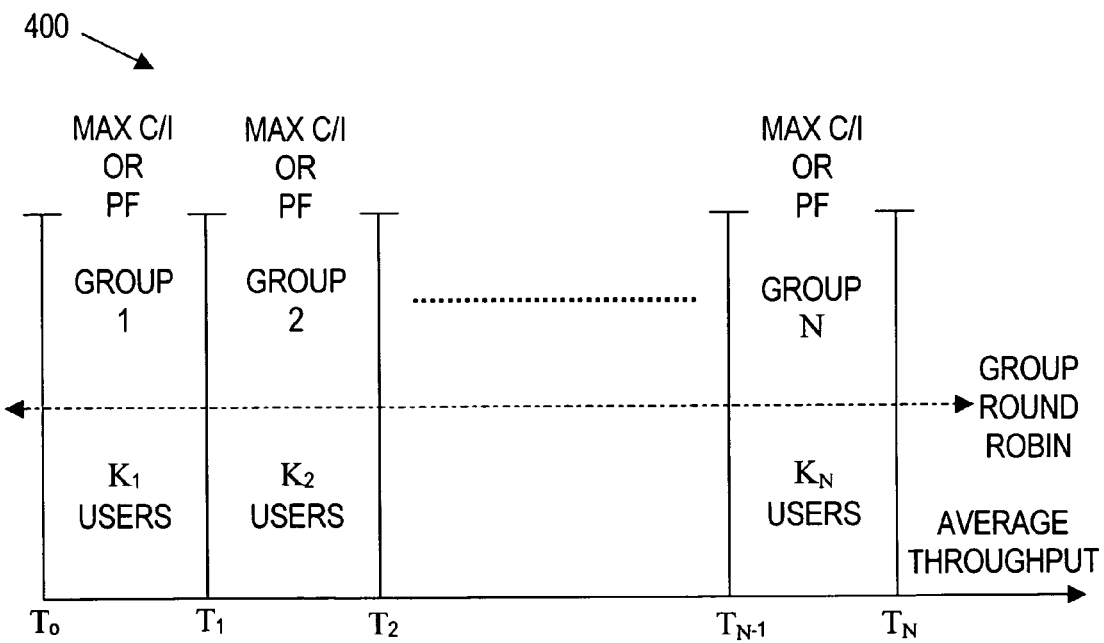
FIG. 4 illustrates an exemplary diagram of the preferred packet scheduling procedure.

FIG. 4 illustrates an exemplary diagram 400 of the preferred packet scheduling procedure. As shown, K users are sorted by average throughput T and divided into N groups, where group N consists of $K_n$ users. A round-robin scheduling procedure is applied to select one of the N groups. A max carrier-to-interference or proportional fair scheduling metric may be used to select a user within the selected group. The selected user may have packets associated with the user scheduled for transmission by a scheduler.

In addition to balancing utilization of bandwidth with fairness among users, the preferred embodiments reduce the number of computations required to be performed by the packet scheduler 202. For example, if 100 communication channels are servicing 100 users, the proportional fair (PF) scheduler calculates the average throughput for the 100 users, which requires approximately 100 operations per transmit time interval (TTI). The achievable data rate of each communication channel is also computed from a look-up table, requiring an additional 100 operations per TTI. Lastly, the maximum value of the proportional fair metric is computed, requiring approximately 200 cross multiply operations per TTI. The total number of operations for the proportional fair scheduler for the exemplary case is approximately 400 per transmit time interval (TTI).

The preferred packet scheduling process begins by calculating the average throughout of the 100 users, requiring around 100 operations per TTI. The sorting of the users by average throughput may be performed every 10 TTI via QuickSort or another suitable algorithm, resulting appropriately in 46 additional operations per TTI. Lastly, the user with the maximum value for the chosen priority metric is determined. In a grouping of five-users per group (twenty total groups), this determination requires performing twenty additional operations per TTI. The total number of operations is 166 per TTI, less than half of the proportional fair scheduler.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a first communication device;
a plurality of second communication devices coupled to the first communication device, each second communication device configured to send and receive packets to the first communication device through a wireless communication channel; and a packet scheduling algorithm that operates on the first communication device, the packet scheduling algorithm configured to group at least two of the plurality of second communication devices into each group of a plurality of groups based on a measured throughput metric with the first communication device, and the packet scheduling algorithm configured to apply a scheduling metric to select a second communication device from each respective group in round-robin order of groups.

2. The system of claim 1 wherein the scheduling metric comprises a maximum carrier-to-interference scheduling metric.

3. The system of claim 1 wherein the scheduling metric comprises a proportional fair scheduling metric.

4. The system of claim 1 wherein the one of the plurality of groups selected for applying a scheduling metric comprises a group that meets a minimum Quality of Service (QoS) criterion.

5. The system of claim 1 wherein the throughput metric is calculated from an averaging function selected from the group consisting of mean, weighted mean, mode, and median.

6. The system of claim 1 wherein the wireless communication channel operates in a communication mode selected from the group consisting of frequency division duplex (FDD), time division duplex (TDD), and a combination thereof.

7. The system of claim 1 wherein each communication channel comprises a pair of electromagnetic frequencies, one for sending packets to the first communication device and another for receiving packets from the first communication device.

8. The system of claim 1 wherein at least one of the plurality of groups comprises a plurality of second communication devices.

9. A system, comprising:
 a transceiver configured to send and receive packets over a plurality of communication channels;
 a packet scheduling program that operates in conjugation with the transceiver, the packet scheduling program configured to group the plurality of communications channels into a plurality of groups based on measured average data rate and configured to apply a priority function to select a communication channel from each respective group in round-robin order of groups.

10. The system of claim 9 wherein the priority function comprises a maximum carrier-to-interference priority function.

11. The system of claim 9 wherein the priority function comprises a proportional fair priority function.

12. The system of claim 9 wherein the average data rate is calculated from an averaging function selected from the group consisting of mean, weighted mean, mode, and median.

* * * * *